United States Patent
Puente Pestaña et al.

(10) Patent No.: US 11,777,806 B2
(45) Date of Patent: Oct. 3, 2023

(54) METHODS, SYSTEM, UE, PGW-U AND MME FOR MANAGING TRAFFIC DIFFERENTIATION

(71) Applicant: Telefonaktiebolaget LM Ericsson (publ), Stockholm (SE)

(72) Inventors: Miguel Angel Puente Pestaña, Madrid (ES); Rodrigo Alvarez Dominguez, Madrid (ES); Miguel Angel Muñoz De La Torre Alonso, Madrid (ES); Ruth Pallares Del Egido, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 103 days.

(21) Appl. No.: 16/968,925

(22) PCT Filed: Mar. 5, 2018

(86) PCT No.: PCT/EP2018/055254
§ 371 (c)(1),
(2) Date: Aug. 11, 2020

(87) PCT Pub. No.: WO2019/158224
PCT Pub. Date: Aug. 22, 2019

(65) Prior Publication Data
US 2021/0051071 A1 Feb. 18, 2021

(30) Foreign Application Priority Data
Feb. 14, 2018 (EP) .................................... 18382085

(51) Int. Cl.
*H04L 41/0896* (2022.01)
*H04L 41/5022* (2022.01)

(52) U.S. Cl.
CPC ...... *H04L 41/0896* (2013.01); *H04L 41/5022* (2013.01)

(58) Field of Classification Search
CPC ............. H04L 41/0896; H04L 41/5022; H04L 12/1407; H04M 15/07; H04M 15/09;
(Continued)

(56) References Cited

U.S. PATENT DOCUMENTS

| | | | | |
|---|---|---|---|---|
| 2014/0302874 | A1* | 10/2014 | Zakrzewski | H04W 4/70 455/456.1 |
| 2015/0110044 | A1* | 4/2015 | Berzin | H04W 28/0252 370/329 |

(Continued)

FOREIGN PATENT DOCUMENTS

| | | | | |
|---|---|---|---|---|
| WO | WO2016172521 | * | 10/2016 | H04W 76/15 |
| WO | WO-2016172521 A1 | * | 10/2016 | H04W 4/70 |

OTHER PUBLICATIONS

3GPP TS 23.682 v15.2.0; Technical Specification; 3rd Generation Partnership Project; Technical Specification Group Services and System Aspects; Architecture enhancements to facilitate communications with packet data networks and applications (Release 15)—Sep. 2017.

(Continued)

*Primary Examiner* — Brian Whipple
(74) *Attorney, Agent, or Firm* — BAKER BOTTS L.L.P.

(57) ABSTRACT

Methods, a system for managing traffic transmitted by a User Equipment (UE), a UE for enabling differentiation of the traffic, a Packet Gate-Way User plane (PGW-U) for managing the traffic as well as a Mobility Management Entity (MME) for enabling differentiation of the traffic are disclosed. The PGW-U (120) receives (9) a marking type and a marking value, which originate from the SCS/AS (170) and which are associated with an application identifier for identifying application traffic to be handled according to the marking type and the marking value. The UE (110) receives (14), from the MME (130), the marking type and the marking value. The UE (110) transmits (17), towards the (Continued)

PGW-U (120), application traffic marked according to the marking type and marking value. The PGW-U (120) inspects (18) the traffic according to the marking type to obtain the marking value. The PGW-U (120) handles (18) the traffic based on the marking value. Corresponding computer programs and computer program carriers are also disclosed.

23 Claims, 6 Drawing Sheets

(58) Field of Classification Search
CPC ...... H04M 15/41; H04M 15/44; H04M 15/66; H04M 15/00; H04W 4/24
USPC .......................................................... 709/238
See application file for complete search history.

(56) References Cited

U.S. PATENT DOCUMENTS

2017/0324652 A1\* 11/2017 Lee ......................... H04L 43/16
2017/0331678 A1   11/2017 Olsson et al.
2017/0332421 A1\* 11/2017 Sternberg ............ H04L 12/4641

OTHER PUBLICATIONS

3GPP TS 29.122 v0.3.0; Technical Specification; 3rd Generation Partnership Project; Technical Specification Group Core Network and Terminals; T8 reference point for Northbound APIs (Release 15)—Oct. 2017.
3GPP TS 29.244 v14.1.0; Technical Specification; 3rd Generation Partnership Project; Technical Specification Group Core Network and Terminals; Interface between the Control Panel and the User Plane of EPC Nodes; Stage 3 (Release 14)—Sep. 2017.
3GPP TS 29.250 v14.1.0; Technical Specification; 3rd Generation Partnership Project; Technical Specification Group Core Network and Terminals; Nu reference point between SCEF an PFDF for sponsored data connectivity (Release 14)—Sep. 2017.
3GPP TS 29.251 v14.1.0; Technical Specification; 3rd Generation Partnership Project; Technical Specification Group Core Network and Terminals; Gw an Gwn reference points for sponsored data connectivity (Release 14)—Sep. 2017.
PCT International Search Report for International application No. PCT/EP2018/055254—dated Nov. 2, 2018.
PCT Written Opinion of the International Searching Authority for International application No. PCT/EP2018/055254—dated Nov. 2, 2018.

\* cited by examiner

METHODS, SYSTEM, UE, PGW-U AND MME FOR MANAGING TRAFFIC DIFFERENTIATION

PRIORITY

This nonprovisional application is a U.S. National Stage Filing under 35 U.S.C. § 371 of International Patent Application Serial No. PCT/EP2018/055254 filed Mar. 5, 2018 and entitled "METHODS, SYSTEM UE, PGW-U AND MME FOR MANAGING TRAFFIC DIFFERENTIATION" which claims priority to European Patent Application No. 18382085.1 filed Feb. 14, 2018, both of which are hereby incorporated by reference in their entirety.

TECHNICAL FIELD

Embodiments herein relate to management of traffic in a network, such as a computer network, a communication network and the like. The management of traffic may include management of traffic differentiation and the like. In particular, a method and a system for managing traffic transmitted by a User Equipment (UE), a method and a UE for enabling differentiation of the traffic, a method and a Packet GateWay User plane (PGW-U) for managing the traffic as well as a method and a Mobility Management Entity (MME) for enabling differentiation of the traffic are disclosed. Corresponding computer programs and computer program carriers are also disclosed.

BACKGROUND

Management of traffic is used in many different computer systems, such as many communication systems are specified by the Third Generation Partnership Project (3GPP). A known computer system can therefore comprise one or more of the following functions as specified by the 3GPP.
Service Capability Exposure Function (SCEF)
The SCEF is a functional element which provides a means to securely expose the services and capabilities provided by 3GPP network interfaces. The SCEF provides access to network capabilities through homogenous application programming interfaces, i.e. Network Representational State Transfer (RESTful) Application Programming Interfaces (APIs).

The SCEF can support mapping between information exchanged with Service Capability Server/Application Server (SCS/AS), e.g. geographical identifiers, and information exchanged with internal Public Land Mobile Network (PLMN) functions, e.g. cell-Id/eNB-Id/Tracking Area Identifier/Multimedia Broadcast Multicast Service, Service Area Identifier etc. This mapping is assumed to be provided by the SCEF based on local configuration data, which can be provided by the operator.
Service Capability Server/Application Server (SCS/AS)
The SCS/AS is the entity which connects Machine Type Communication (MTC) application servers to the 3GPP network to enable them to communicate through specific 3GPP defined services with UEs used for MTC and with the SCEF in the Home Public Land Mobile Network (HPLMN). The SCS/AS offers capabilities for use by one or multiple MTC application servers. The MTC applications in the external network are hosted on one or more ASs. The communication between the SCS/AS and the SCEF supports Packet Flow Description (PFD) management procedures.
Packet Flow Description Function (PFDF)

The PFDF is a functional element which receives and manages the PFDs associated to application identifier (s) from the SCEF via the Nu reference point.
PFD is a set of information enabling the detection of application traffic including:
  PFD id; and
  a 3-tuple including protocol, server-side IP address and port number; or
  the significant parts of the URL to be matched, e.g. host name; or
  a Domain name matching criteria.
The PFDF provisions PFDs for the corresponding application identifier (s) to the PGW-C/TDF as defined in 3GPP Technical Specification (TS) 23.203.
Packet Data Network (PDN) Gateway Control plane function (PGW-C)
The PGW control plane function (PGW-C) provides the functionality of the PGW as defined by TS 23.401 and TS 23.402, and the Policy and Charging Enforcement Function (PCEF) as defined by the TS 23.203 except for the functions that are performed by the PGW-U.
PDN Gateway User plane function (PGW-U)
The PGW user plane function (PGW-U) provides the User Plane (UP) functionality of the PGW. The functionality of PGW-U is defined in TS 23.214.
Interfaces
T8
The T8 reference point is between the SCS/AS and the SCEF. It specifies RESTful APIs that allow the SCS/AS to access the services and capabilities provided by 3GPP network entities and securely exposed by the SCEF.
The T8 reference point supports the following procedures:
Monitoring Procedures
Procedures for resource management of Background Data Transfer
Procedures for changing the chargeable party
Procedures for Non-Internet Protocol (IP) Data Delivery
Procedures for Device Triggering
Procedures for Group Message Delivery
Procedures for Reporting of Network Status
Procedures for Communication Pattern Parameters Provisioning
Procedures for PFD Management
Procedures for Enhanced Coverage Restriction Control
Procedures for Network Parameter Configuration
Procedures for setting up an AS session with required QoS
Procedures for Mobile Station MSISDN-less Mobile Originated SMS
Procedures for PFD Management
In order to create resources for PFDs, the SCS/AS shall send an HTTP POST message to the request URL including one or more set of PFDs for external Application Identifier(s). The body of the HTTP POST message shall include SCS/AS Identifier, TTRI, external Application Identifier(s) and PFDs associated with its PFD Identifier(s), an Allowed Delay may be included for the external Application Identifier(s) as well.
After receiving the HTTP POST message, if the SCS/AS is authorized, the SCEF shall create resource(s) for each internal Application Identifier mapped from the external Application identifier, and send the PFDs to the PFDF as defined in 3GPP TS 29.250 [26]. When receiving the response from the PFDF, the SCEF shall send an HTTP response to the SCS/AS with a corresponding status code and include TTRI, a list of external Application Identifier(s) and result(s) in the body of the HTTP response.

The PFDManagement API is not defined yet in the standard for T8 interface.

Nu

The Nu reference point is located between the Packet Flow Description Function (PFDF) and the Service Capability Exposure Function (SCEF). The Nu reference point is used for provisioning of PFDs from the SCEF to the PFDF and reporting the result of the PFD Management from the PFDF to the SCEF.

The only procedure over Nu is the Management of PFD.

The PFDs provisioning procedure is performed through HTTP transactions consisting of a request initiated by the SCEF and answered by the PFDF.

The body of the message encoded in JSON format and shall include:
- for the PFD(s) creation for a new application identifier, a new application identifier and its full list of PFD(s) to be created;
- for the PFD(s) full update for an existing application identifier, the existing application identifier and its new full list of PFD(s)
- for the PFD(s) partial update for an existing application identifier, the existing application identifier, partial update indication and
  - new PFD(s) with new PFD identifier(s) to add new PFD(s),
  - new PFD(s) with existing PFD identifier(s) to update existing PFD(s), and/or
  - the existing PFD identifier(s) without any content to remove the existing PFD(s);
- for the PFD(s) removal for an existing application identifier, the existing application identifier and the removal indication.

Gw

The Gw reference point is located between the Packet Flow Description Function (PFDF) and the Policy and Charging Enforcement Function (PCEF). However, in Control and User Plane separation of Evolved Packet Core (EPC) nodes (CUPS), PGW-C and PGW-U jointly provide functionality equivalent to the functionality provided by the PCEF as defined by the TS 23.203. Therefore, with CUPS the entity that interfaces the PFDF through the Gw interface is the PGW-C node.

The Gw reference point is used for provisioning and removal of PFDs from the PFDF to the PGW-C and reporting the handling result of PFDs from the PGW-C to the PFDF.

The procedures over Gw reference point when the PFDF is deployed and the management of PFDs is supported by the PGW-C may be:
- Pull mode only, or
- Push mode only, or
- Combination mode.

Request for PFDs ("Pull mode" and "Combination mode")

At the time a Policy and Charging Control (PCC) Rule with an application identifier for which PFDs are not available is activated or provisioned, or when the caching timer for an application identifier elapses and a PCC Rule for the application identifier is still active, the PGW-C shall request all PFDs for the application identifier from the PFDF.

The PGW-C shall send an HTTP GET message to the PFDF to retrieve the PFDs for one or more application identifier(s). The PFDF shall provide the PFDs of the specified application identifier(s) from the request within the body of the HTTP response.

Provisioning of PFDs ("Push mode"" and "Combination mode")

The PFDF may create, update or remove one or multiple PFDs associated with application identifier(s) to the PGW-C. When the request for creation, update, or removal for an application identifier(s) is received from the SCEF, for the Push mode, the PFDF shall for each PGW-C it serves:
- immediately send to the PGW-C an HTTP POST message including the provisioned changes of one or more application identifiers, or
- wait for a period shorter than the allowed delay (e.g. to aggregate all the PFDs for several application identifiers), then send to the PGW-C an HTTP POST message including the provisioned changes.

Sx

Sxb is the reference point between PGW-C and PGW-U. In this specification we refer to this reference point simply as Sx. It is specified in TS 29.244.

The Sx procedure relevant for this discussion is the Sx PFD Management Procedure.

The Sx PFD Management procedure may be used by the CP function and UP function to provision PFDs to the UP function, for one or more application identifiers.

The UP function shall store the PFDs provisioned per application identifier. These PFDs shall apply to all the Sx session established in the UP function, for all the controlling CP functions, i.e. the scope of a PFD is not limited to the Sx sessions established by the CP function which provisioned the PFD.

The information, sent along with the application identifier (App ID), is comprised in an Information Element (IE) called PDF content, see TS 29.244 for details:

TABLE 1

| | PDF contents IE | | | | | | |
|---|---|---|---|---|---|---|---|
| | Bits | | | | | | |
| Octets | 8 | 7 | 6 | 5 | 4 | 3 | 2 | 1 |
| 1 to 2 | Type = 61 (decimal) | | | | | | |
| 3 to 4 | Length = n | | | | | | |
| 5 | Spare | | | CP | DN | URL | FD |
| 6 | Spare | | | | | | |
| m to (m + 1) | Length of Flow Description | | | | | | |
| (m + 2) to p | Flow Description | | | | | | |
| q to (q + 1) | Length of URL | | | | | | |
| (q + 2) to r | URL | | | | | | |
| s to (s + 1) | Length of Domain Name | | | | | | |
| (s + 2) to t | Domain Name | | | | | | |
| u to (u + 1) | Length of Custom PFD Content | | | | | | |
| (u + 2) to v | Custom PFD Content | | | | | | |
| w to (n + 4) | These octet(s) is/are present only if explicitly specified | | | | | | |

The flow-description is of type string array. The content of the string has the same encoding as the IPFilterRule Attribute Value Pair (AVP) value as defined in IETF RFC 6733. It represents a 3-tuple with protocol, server ip and server port for UL/DL application traffic.

According to a first known packet marking solution, a process of setting a tag or footprint in the protocol headers of a packet can be performed by introducing information in the packet directly sent by the end user. According to the layer where this tag is introduced, there are several technologies, for example:

IP layer: In the past, it was defined this field in the IP header called Type Of Service (TOS), that is defined in https://tools.ietf.org/html/rfc791. Nowadays, TOS has been replaced by DSCP, as defined by https://tools.ietf.org/html/rfc2474.

TCP layer: using TCP options field, a footprint can be introduced in this field

According to a second known packet marking solution, the process of setting the tag or footprint in the protocol headers can be performed by introducing a new layer in the packet sent by the end user.

Common techniques are:

Network Service Header (NSH), introduces a field in layer 3. See more information in https://tools.ietf.org/html/draft-quinn-nsh-01, section 5.

Virtual Local Area Network (VLAN) and Virtual Extensible Local Area Network (VXLAN) introduce a tag in Layer 2. It is defined in https://tools.ietf.org/html/rfc7348.

Multiprotocol Layer Switching (MPLS) introduces specific labels in layer 2. It is defined in https://tools.ietf.org/html/rfc3031.

SUMMARY

The present inventors have realized that traffic differentiation for future scenarios may not be handled by existing solutions as will be described in the initial portion of the detailed description below.

An object may therefore be to improve flexibility of traffic differentiation in a network of the above mentioned kind.

According to an aspect, the object is achieved by a method, performed by a system comprising a UE, A PGW-U, an MME and a SCS/AS, for managing traffic transmitted by the UE. The traffic is associated with a set of PFD related parameters. The system performs the method as follows. The PGW-U receives a marking type and a marking value, which originate from the SCS/AS and which are associated with an application identifier for identifying application traffic to be handled according to the marking type and the marking value. The UE receives, from the MME, the marking type and the marking value. The UE transmits, towards the PGW-U, the application traffic marked according to the marking type and marking value. The PGW-U inspects the application traffic according to the marking type to obtain the marking value. The PGW-U handles the application traffic based on the marking value.

According to a further aspect, the object is achieved by a method, performed by a UE, for enabling differentiation of traffic transmittable by the UE. The UE receives, from an MME, a marking type and a marking value, which originate from a SCS/AS and which are associated with an application identifier for identifying application traffic. The UE transmits, toward the PGW-U, the application traffic marked according to the marking type and marking value.

According to another aspect, the object is achieved by a method, performed by a PGW-U, for managing traffic transmitted by a UE. The traffic is associated with a set of PFD related parameters. The PGW-U receives a marking type and a marking value, which originate from a SCS/AS and which are associated with an application identifier for identifying application traffic to be handled according to the marking type and the marking value. The PGW-U receives the application traffic from the UE. The PGW-U inspects the application traffic according to the marking type to obtain the marking value. The PGW-U handles the application traffic based on the marking value.

According to a further aspect, the object is achieved by a method, performed by an MME, for enabling differentiation of traffic transmittable by a UE. The MME receives, from one of a PGW-C and a PFDF, a marking type and a marking value, which originate from a SCS/AS and which are associated with an application identifier for identifying application traffic to be handled according to the marking type and the marking value. The MME transmits, to the UE, the marking type and marking value for the application identifier.

According to a still other aspect, the object is achieved by a system, comprising a UE, a PGW-U, an MME and a SCS/AS, configured for managing traffic transmitted by the UE. The traffic is associated with a set of PFD related parameters, The SCS/AS is configured for transmitting a marking type and a marking value, which are associated with an application identifier for identifying application traffic to be handled according to the marking type and the marking value. The PGW-U is configured for receiving the marking type and the marking value, which originate from the SCS/AS. The MME is configured for transmitting, towards the UE, the marking type and the marking value, which originate from the SCS/AS and which are associated with the application identifier. The UE is configured for receiving, from the MME, the marking type and the marking value, which originate from the SCS/AS and which are associated with the application identifier. The UE is configured for transmitting towards the PGW-U, the application traffic marked according to the marking type and marking value. The PGW-U is configured for receiving the application traffic from the UE. The PGW-U is configured for inspecting the application traffic according to the marking type to obtain the marking value. The PGW-U is configured for handling the application traffic based on the marking value.

According to a still further aspect, the object is achieved by a UE configured for enabling differentiation of traffic transmittable by the UE. The UE is configured for receiving, from an MME, a marking type and a marking value, which originate from a SCS/AS and which are associated with an application identifier for identifying application traffic. The UE is configured for transmitting, toward the PGW-U, the application traffic marked according to the marking type and marking value.

According to yet another aspect, the object is achieved by a PGW-U configured for managing traffic transmitted by a UE. The traffic is associated with a set of PFD related parameters. The PGW-U is configured for receiving a marking type and a marking value, which originate from a SCS/AS and which are associated with an application identifier for identifying application traffic to be handled according to the marking type and the marking value. The PGW-U is configured for receiving the application traffic from the UE. The PGW-U is configured for inspecting the application traffic according to the marking type to obtain the marking value. The PGW-U is configured for handling the application traffic based on the marking value.

According to a yet further aspect, the object is achieved by an MME configured for enabling differentiation of traffic transmittable by a UE. The MME is configured for receiving, from one of a PGW-C and a PFDF, a marking type and a marking value, which originate from a SCS/AS and which are associated with an application identifier for identifying application traffic to be handled according to the marking type and the marking value. The MME is configured for transmitting, to the UE, the marking type and marking value for the application identifier.

According to further aspects, the object is achieved by computer programs and computer program carriers corresponding to the aspects above.

The marking type and the marking value are associated with the application identifier. In this manner, the embodiments herein enable traffic differentiation by means of ensuring that it is possible to transfer the marking type and the marking value, in connection with the associated application identifier, to entities within the network, such as the UE, the PGW-U, the MME and the like. Upon reception of traffic, the PGW-U differentiates the traffic by identifying the marking value based on the marking type, where the marking type may indicate a protocol layer and a field for carrying the marking value.

As an example, thanks to the embodiments herein, an OTT may implement traffic differentiation for traffic originating from a UE in an operator's network even if the traffic shares the same PFD related parameters. This is achieved by that the OTT provides to the operator, e.g. eventually to the PGW-U, not only the PFD related parameters, but also the marking type and the marking value.

According to some embodiments herein, the UE performs packet marking, or traffic marking, according to the marking type and marking value, received from the MME, where the marking type and marking value may have been received upon attachment to the operator's network or on start of an application in the UE. As a result, the UE is configured with the marking type and the marking value, which both are associated with a certain application identifier, such as an App ID or the like. The traffic marking may utilize DSCP, NSH or the like.

With reference to a 3GPP network of an operator, at least one of the following interfaces may be enhanced according to the embodiments herein: T8, Nu, Gw and Sx interfaces.

Advantageously, the embodiments herein may enable traffic differentiation in an operator's network, which may comprise the PGW-U, the MME and the like, when the traffic types to be differentiated share the same PFD parameters and come from the same UE, i.e. from the same subscriber.

BRIEF DESCRIPTION OF THE DRAWINGS

The various aspects of embodiments disclosed herein, including particular features and advantages thereof, will be readily understood from the following detailed description and the accompanying drawings, which are described briefly in the following.

DETAILED DESCRIPTION

According to the state of the art, the Over The Top (OTT or OTT provider) can communicate information to the operator so that the operator is able to differentiate and classify the OTT traffic appropriately. This information is included in a standardized PFD (Packet Flow Description). The PFD enables detection of application traffic and includes: PFD id; a 3-tuple (including protocol, server-side IP address and port number); or the significant parts of the Universal Resource Locator (URL) to be matched, e.g. host name; or a Domain name matching criteria. The information included in the PFD is herein sometimes referred to as PFD related parameters.

However, the known PFD is not enough to differentiate the traffic in some MTC use cases. For example, in automotive industry, a car manufacturer, acting as OTT in this case, may wish to allow the operator to differentiate traffic coming from tethered devices, i.e. devices connected to the car's WiFi hotspot, and charge the car manufacturer for the car's data and the driver for the tethering data in a differentiated manner.

To illustrate this problem let's consider the same YouTube video which is being reproduced in the car's infotainment system, i.e. screens integrated in the car, and in a passenger's mobile device, being connected to the car's WiFi hot-spot. Both types of traffic share the same PFD parameters, so it's not possible for an operator to differentiate these two traffics with the current state of the art solutions.

Another possible scenario comes with Internet of Things (IoT) devices with several sensors. The IoT device provider (OTT in this case) may want the operator to differentiate data coming from different sensors for the same IoT device. E.g. if for the same IoT device some sensors indicate critical information and other sensors provide non-critical information, the OTT might want the operator to treat the data differently.

To illustrate this scenario let's consider a smart home device incorporating a proximity sensor and a temperature sensor. The proximity sensor can be used for home security detecting the presence of intruders, while the temperature sensor only monitors the temperature periodically. In this case the information provided by the proximity sensor should be given higher priority than the information provided by the temperature sensor.

Throughout the following description, similar reference numerals have been used to denote similar features, such as nodes, actions, modules, circuits, parts, items, elements, units or the like, when applicable. In the Figures, features that appear in some embodiments are indicated by dashed lines.

Figure 5:
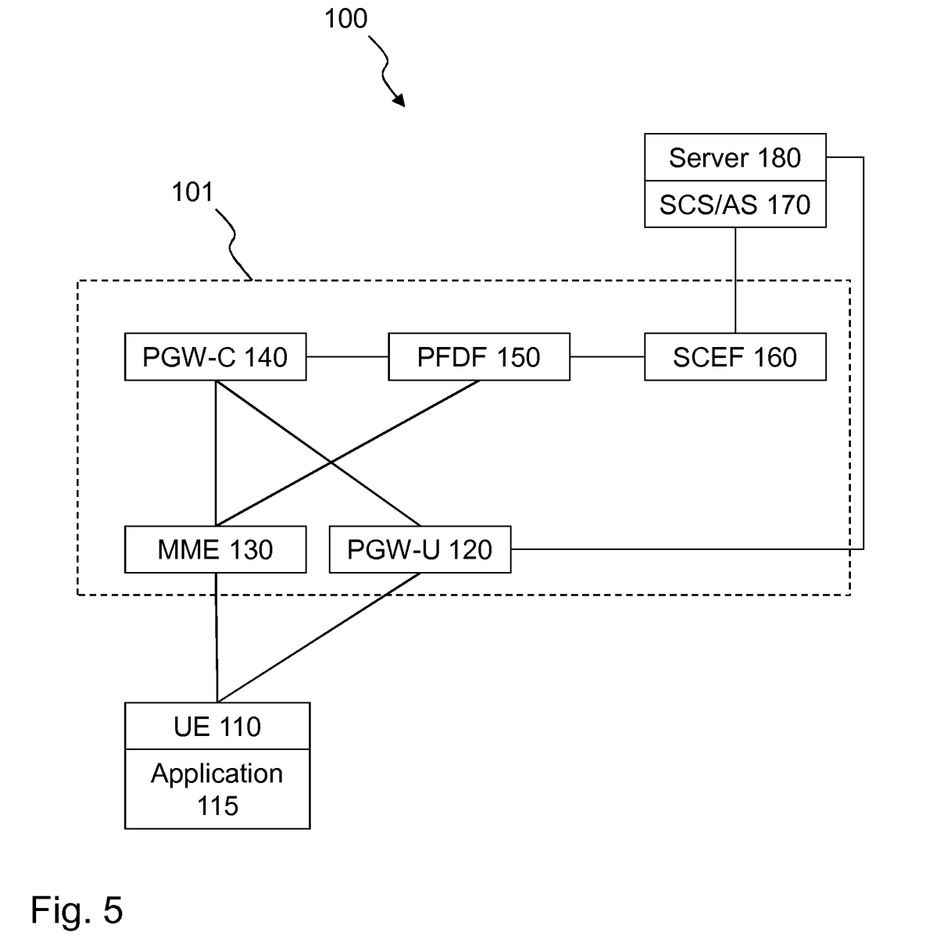
FIG. 5 is a schematic overview of an exemplifying system in which embodiments herein may be implemented.

FIG. 5 depicts an exemplifying system 100 in which embodiments herein may be implemented.

In this example, the system 100 may comprise an operator's network 101. The operator's network may comprise a Global System for Mobile communications network, a Long Term Evolution (LTE), Universal Mobile Telecommunication System (UMTS) and Worldwide Interoperability for Microwave Access (WiMAX), evolutions thereof or the like.

The system 100 may be said to comprise a user equipment 110. This may mean that the user equipment 110 is present in the operator's network 101, such as attached thereto, connected thereto or the like. As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor device may detect any kind of metric, such as wind, temperature, air pressure, humidity, light, electricity, sound, images etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

Furthermore, the system 100 and/or the operator's network 101 comprises a PGW-U 120, an MME 130, a PGW-C 140, a PFDF 150, a SCEF 160. These functions, or entities, may have their known functionality in addition to what is described below.

The system 100 may comprise a SCS/AS 170, which may host a server 180. The server 180 may provide a service, such as streaming of video, providing sensor data, providing any information on request, being able to receive any information for storage etc. The server 180 may implement any service provided by an OTT.

Additionally, the user equipment 110 may host an application 115, which may act as a client to the server 180.

Before proceeding with a description of an exemplifying method according to the embodiments herein, it may be noted that the embodiments herein enable traffic differentiation in the operator's network 101 when the traffic types to differentiate share the same PFD parameters and come from the same subscriber.

The following preconditions may apply:

As a first precondition, the UE 110 may transfer different traffic types, e.g. car infotainment, car sensors and user tethered traffic using car's WiFi hotspot for the automotive use case, that share the same PFD parameters. These traffic types are identified by different application identifiers. Each application identifier is associated with a marking type and a marking value to enable traffic differentiation as described with reference to e.g. FIG. 6.

As a second precondition, the UE 110 is able to mark the different traffic types to be differentiated by the operator. The marking can be of different types. The marking value can be statically configured in the UE 110, or dynamically provided to the UE 110. Each traffic type is marked by a different combination of marking type and marking value.

As a third precondition, both the OTT and the operator have a common understanding about a set of marking types. The marking type specifies what field and in which protocol layer the marking value is carried.

Figure 6:
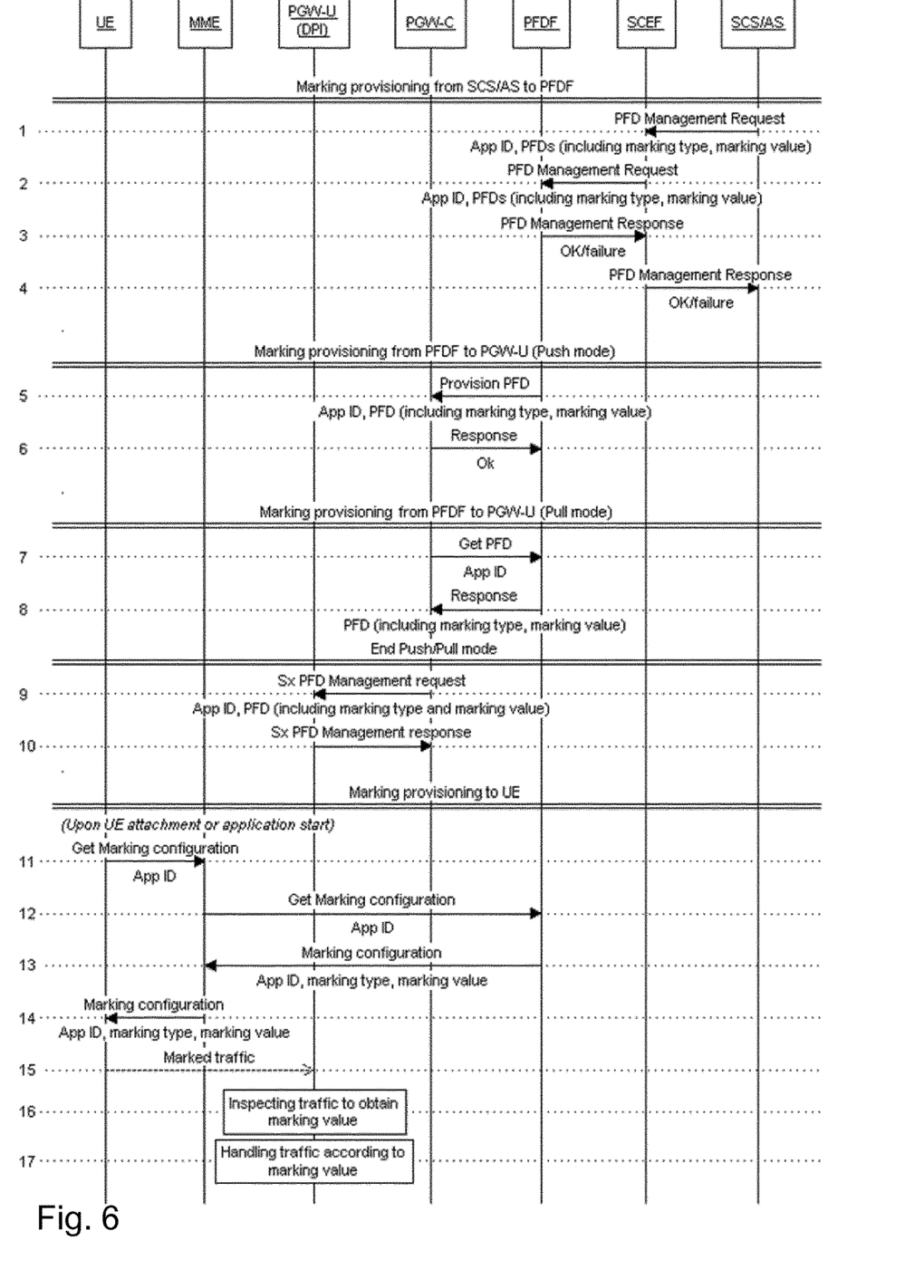
FIG. 6 is a combined signaling and flowchart illustrating the methods herein.

FIG. 6 illustrates an exemplifying method according to embodiments herein when implemented in the system 100 of FIG. 5. Accordingly, the system 100 performs a method for managing traffic transmitted by the UE 110, wherein the traffic is associated with a set of PFD related parameters. In particular, the traffic may be associated with only one set of PFD related parameters.

The PFD-related parameters may comprise a PFD identifier, a parameter related to a packet identification. The parameter related to packet identification may comprise at least one of:

a 3-tuple including protocol, server-side IP address and port number,
significant parts of an URL to be matched, e.g. host name, and
a Domain name matching criteria.

One or more of the following actions may be performed in any suitable order.

Action 1

The OTT, e.g. car manufacturer acting as SCS/AS 170, will trigger a T8 PFD Management Request message to the operator's SCEF in order to indicate how to differentiate a certain traffic type identified by an App ID. The OTT may thus be represented by the server 180, hosted by the SCS/AS 170. As indicated below, e.g. a YouTube video played in the car's infotainment system, i.e. screens integrated in the car, and in a passenger's mobile device will share the same PFD parameters. This implies that for operator's network to be able differentiate the traffic (e.g. to charge the above traffic differently), the UE 110 needs to mark the different traffic types. So the OTT indicates through e.g. T8 the application identifier, or App ID, and a corresponding marking type and marking value, e.g. marking type set to NSH and marking value set to a certain tag, as part of an extension of existing 3GPP PFD. There is one application identifier for each traffic type.

Action 2

SCEF 160 may typically authorize the request and trigger a PFD Management Request message towards PFDF 150 through Nu interface passing the same parameters as in Action 1, i.e. also including the marking type and marking value.

Action 3

PFDF 150 may store the App ID/s and the corresponding PFDs, including the marking type and the marking value, and will answer back to SCEF 160 through Nu interface (assumed successful response).

Action 4

SCEF 160 may answer back to SCS/AS 170 (assumed successful response).

There are two different modes in 3GPP to provision the PFDs to the PGW-C 140: push or pull mode.

Push mode: This mode can be triggered e.g. after the previous four actions.

Action 5

The PFDF 150 may provision the PFDs, including the marking type and the marking value, for the App ID (traffic type) in the PGW-C 140 through Gw interface.

Action 6

The PGW-C 140 may answer back to PFDF 150 through Gw interface (assumed successful response).

Pull mode: This mode can be triggered e.g. when the UE 110 device triggers an IP-CAN session establishment, the PGW-C 140 node will convey to PCRF node the subscriber identity, e.g. International Mobile Subscriber Identity (IMSI) in the IP-CAN session establishment request (in case of 4G networks, a Gx initial Credit Control Request, CCR, message). PCRF, based on the received subscriber identity, e.g. car IMSI, will install the corresponding PCC rules and include them in the IP-CAN session establishment response (in case of 4G networks, a Gx initial Credit Control Answer, CCA, message). In this case, PCRF will activate predefined PCC rules for the different car traffic types (APP IDs).

Action 7

The PGW-C 140 requests to the PFDF 150 the PFD rules for the App ID/s (e.g. the ones received from PCRF in the PCC rules) through Gw interface Action 8

The PFDF 150 may answer the PGW-C 140 with the PFD rules for the car App ID/s through Gw interface. These PFD rules will include marking type and marking value/s.

After having obtained the marking type and marking value at the PGW-C with the push mode or pull mode, action 9 and/or 10 may be performed.

Action 9

The PGW-C 140 may provision the PFDs (including marking type and marking value) for the car's App IDs (traffic types) in the PGW-U through Sx interface and using the Sx PFD Management procedure, including the marking type and marking value e.g. in a PDF contents Information Element.

Thus, the PGW-U 120 receives the marking type and the marking value. Both the marking type and the marking value originate from a SCS/AS 170 and are associated with the application identifier for identifying application traffic to be handled according to the marking type and the marking value.

Action 10

The PGW-U may answer back to PGW-C 140 through Sx interface (assumed successful response).

Marking provisioning to UE: The marking type and marking value to use for a certain traffic type (application identifier aka App ID) may preferably also be communicated to the UE 110. One possibility is that the UE 110 has already predefined a default marking type and marking value for a certain App ID, so the following steps would not be needed. If no default or predefined marking type and marking value are provided, the following action may take place:

Action 11

Upon UE attachment or application start, the UE 110 may send to the MME a request for the marking configuration for a certain App ID. This is carried out through NAS signaling. Expressed differently, the UE 110 may transmit, to the MME 130, a request for the marking type and marking value for an application identifier. This action is referred to as "Get marking configuration" in FIG. 6.

Action 12

The MME may send a message to request the marking configuration for the App ID to the PFDF 150.

Another possibility, not illustrated, is to send the message to PGW-C 140 and trigger a pull procedure as in actions 7 and 8. Then the PGW-C 140 sends the marking type and marking value to the MME. This is not shown in FIG. 6.

Expressed differently, the MME 130 may transmit, toward the one of PGW-C 140 and PFDF 150, a request for the marking type and the marking value for an application identifier.

Action 13

The PFDF 150 sends the marking type and marking value for the application identifier to the MME 130.

As explained above, the MME 130 may request the marking type and marking value from the PGW-C 140 by causing the PGW-C 140 to pull the marking type and marking value from the PFDF 150. Thus, the MME 130 receives, from one of a PGW-C 140 and a PFDF 150, the marking type and the marking value, which originate from a SCS/AS 170 and which are associated with the application identifier for identifying application traffic to be handled according to the marking type and the marking value.

Action 14

The MME sends the marking type and marking value for the App ID to the UE 110.

The UE 110 receives, from an MME 130, a marking type and a marking value, which originate from a SCS/AS 170 and which are associated with an application identifier for identifying application traffic.

Action 15

The UE 110 transmits, toward the PGW-U 120, the application traffic marked according to the marking type and marking value. As an example, action 15 may mean that the UE 110 sends the traffic of the application 115, identified by the App ID, and marked according to the received marking type and marking value. As a result, the PGW-U 120 receives the traffic from the UE 110.

Action 16

Upon reception of the traffic, the PGW-U 120 inspects the application traffic and gets the marking type and marking value carried out in the packet along with the other PFD parameters. The PGW-U 120 checks whether the PFD parameters, including the marking type and the marking value, match the rules received from PGW-C 140. If there is a match, then PGW-U 120 associates that packet to the corresponding application identifier. The PGW-U 120 inspects the traffic according to the marking type to obtain the marking value.

Any traffic from the UE may be inspected in this action, but for the purpose of the embodiments herein, it is the application traffic that is of interest. When the PGW-U inspects any traffic from the UE, the marking value may not be obtained unless it is the application traffic that is inspected at the moment.

Action 17

In this action, the PGW-U 120 handles the application traffic based on the marking value. The marking value is found, by the PGW-U 120, thanks to that the marking type provides information about protocol and field in that protocol. Now, the PGW-U 120 may carry out appropriate enforcement that has been configured, e.g. by reception from PGW-C 140 following the Sx standard procedure, for that application identifier.

According to various embodiments herein, the following may be noted.

The embodiments herein pertain to the traffic management, and specifically apply to Policy and Deep Packet Inspection (DPI).

The proposed solution allows an operator to differentiate traffic types in MTC use cases that are not possible to be differentiated with state of the art solutions, i.e. when the different traffic types share the same PFD and come from the same subscriber.

The marking type and the marking value, associated with the application identifier, may be received along with PFD-related parameters. Expressed differently, the marking value and the marking type may be conveyed in connection with PFD-related parameters.

The marking type and the marking value may be comprised in a PFD Management Request of a T8/Nu/Sx interface.

The marking type and the marking value may be comprised in a Provision PFD message of a Gw interface or a Response message of a Gw interface.

The marking type and the marking value, received by the MME 130, are comprised in a message of an interface between the MME and the PFDF 150. Alternatively, they could also be comprised in a message of an interface according to the embodiments herein between the MME and the PGW-C 140.

The get marking request including the application identifier may be received by the MME and may be comprised in a message of the NAS interface between the UE 110 and the MME, e.g. specified in 3GPP TS 24.301. This message is part of a UE-requested Session Management procedure, as given by the embodiments herein, of the NAS interface.

The marking type and marking value received by the UE are comprised in a message of the NAS interface as the response of the previous get marking request.

Figure 7:
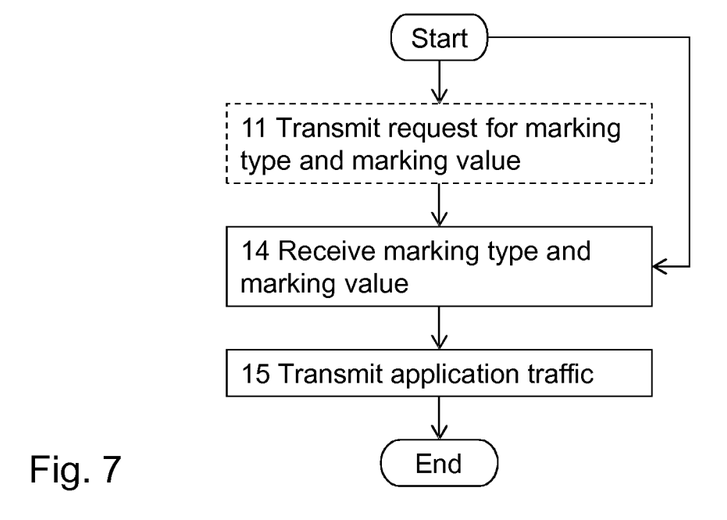
FIG. 7 is a flowchart illustrating embodiments of the method in the UE.

In FIG. 7, a schematic flowchart of exemplifying methods in the UE 110 is shown. Again, the same reference numerals as above have been used to denote the same or similar features, in particular the same reference numerals have been used to denote the same or similar actions. Accordingly, the UE 110 performs a method for enabling differentiation of traffic transmittable by the UE 110.

As mentioned, the marking type may indicate a protocol layer and a field of the protocol layer. The field may carry the marking value. The marking type and the marking value, received by the UE 110, may be comprised in a marking configuration message of an S1-MME interface. The marking type and the marking value may be received along with PFD-related parameters. The application traffic may be anyone of: traffic of a user application executed by the UE, and traffic of an external device connected to the UE.

One or more of the following actions may be performed in any suitable order.

Action 11

The UE 110 may transmit, to the MME 130, a request for the marking type and marking value for an application identifier.

Action 14

The UE 110 receives, from an MME 130, a marking type and a marking value, which originate from a SCS/AS 170 and which are associated with an application identifier for identifying application traffic.

Action 15

The UE 110 transmits, toward the PGW-U 120, the application traffic marked according to the marking type and marking value.

Figure 8:
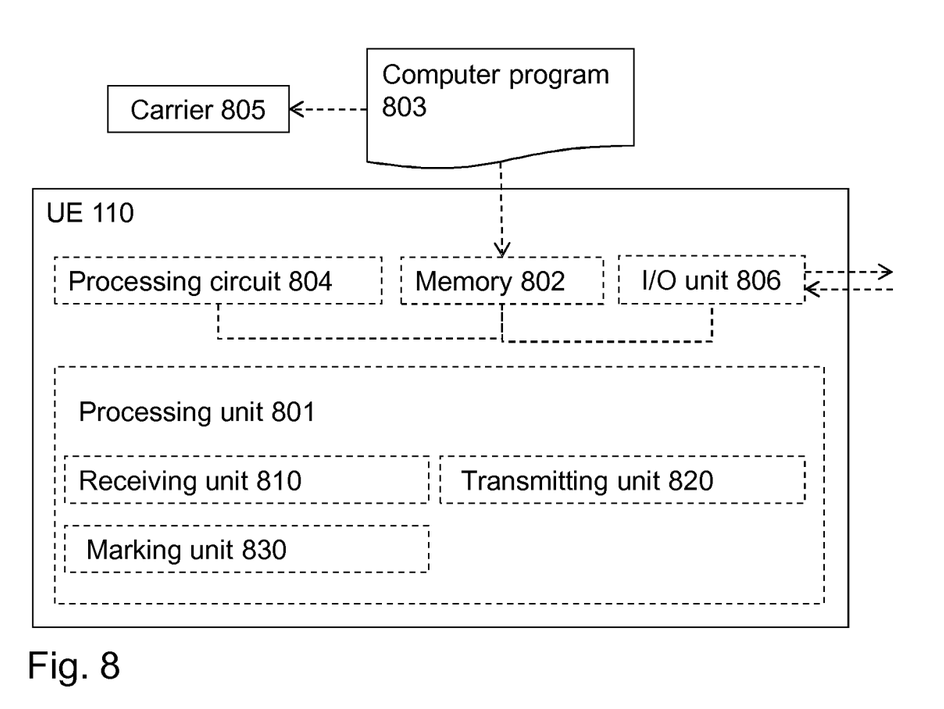
FIG. 8 is a block diagram illustrating embodiments of the UE.

With reference to FIG. 8, a schematic block diagram of embodiments of the UE 110 of FIG. 5 is shown.

The UE 110 may comprise a processing unit 801, such as a means for performing the methods described herein. The means may be embodied in the form of one or more hardware units and/or one or more software units. The term "unit" may thus refer to a circuit, a software block or the like according to various embodiments as described below.

The UE 110 may further comprise a memory 802. The memory may comprise, such as contain or store, instructions, e.g. in the form of a computer program 803, which may comprise computer readable code units.

According to some embodiments herein, the UE 110 and/or the processing unit 801 comprises a processing circuit 804 as an exemplifying hardware unit, which may comprise one or more processors. Accordingly, the processing unit 801 may be embodied in the form of, or 'realized by', the processing circuit 804. The instructions may be executable by the processing circuit 804, whereby the UE 110 is operative to perform the methods of FIG. 6 and/or FIG. 7. As another example, the instructions, when executed by the UE 110 and/or the processing circuit 804, may cause the UE 110 to perform the method according to FIG. 6 and/or FIG. 7.

In view of the above, in one example, there is provided a UE 110 for enabling differentiation of traffic transmittable by the UE 110. Again, the memory 802 contains the instructions executable by said processing circuit 804 whereby the UE 110 is operative for:

receiving, from an MME 130, a marking type and a marking value, which originate from a SCS/AS 170 and which are associated with an application identifier for identifying application traffic, and transmitting, toward the PGW-U 120, the application traffic marked according to the marking type and marking value.

FIG. 8 further illustrates a carrier 805, or program carrier, which comprises the computer program 803 as described directly above. The carrier 805 may be one of an electronic signal, an optical signal, a radio signal and a computer readable medium.

In some embodiments, the UE 110 and/or the processing unit 801 may comprise one or more of a receiving unit 810, a transmitting unit 820, and a marking unit 830 as exemplifying hardware units. The term "unit" may refer to a circuit when the term "unit" refers to a hardware unit. In other examples, one or more of the aforementioned exemplifying hardware units may be implemented as one or more software units.

Moreover, the UE 110 and/or the processing unit 801 may comprise an Input/Output unit 806, which may be exemplified by the receiving unit and/or the transmitting unit when applicable.

Accordingly, the UE 110 is configured for enabling differentiation of traffic transmittable by the UE 110.

Therefore, according to the various embodiments described above, the UE 110 and/or the processing unit 801 and/or the receiving unit 810 is configured for receiving, from an MME 130, a marking type and a marking value, which originate from a SCS/AS 170 and which are associated with an application identifier for identifying application traffic.

The UE 110 and/or the processing unit 801 and/or the transmitting unit 820 is configured for transmitting, toward the PGW-U 120, the application traffic marked according to the marking type and marking value.

The UE 110 and/or the processing unit 801 and/or the transmitting unit 820 may be configured for transmitting 13, to the MME 130, a request for the marking type and marking value for an application identifier.

The UE 110 and/or the processing unit 801 and/or the receiving unit 810 may be configured for receiving the marking type and the marking value in a marking configuration message of an S1-MME interface.

The UE 110 and/or the processing unit 801 and/or the marking unit 830 may be configured for marking the traffic according to the marking type and marking value, e.g. before the traffic is sent.

The marking type may indicate a protocol layer and a field of the protocol layer. The field may carry the marking value.

The marking type and the marking value may be receivable along with PFD-related parameters.

The application traffic may be anyone of:

traffic of a user application executed by the UE, and traffic of an external device connected to the UE.

Figure 9:
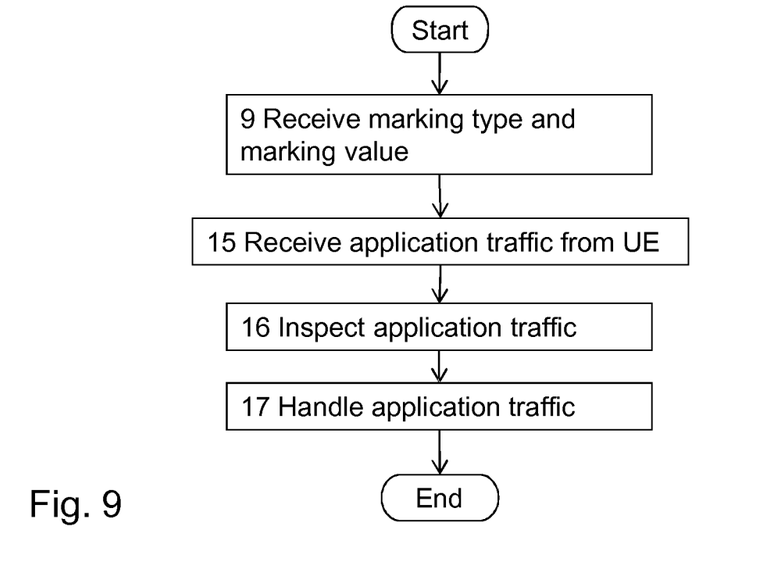
FIG. 9 is a flowchart illustrating embodiments of the method in the PGW-U.

In FIG. 9, a schematic flowchart of exemplifying methods in the PGW-U 120 is shown. Again, the same reference numerals as above have been used to denote the same or similar features, in particular the same reference numerals have been used to denote the same or similar actions. Accordingly, the PGW-U 120 performs a method managing traffic transmitted by a UE 110. The traffic is associated with a set of PFD related parameters.

As mentioned, the marking type and a marking value may be received from a PGW-C 140. The marking type may indicate a protocol layer and a field of the protocol layer. The field may carry the marking value. The marking type and the marking value, received by the PGW-U 120, may be comprised in a PFD Management Request of an Sx interface. The marking type and the marking value may be received along with PFD-related parameters. The application traffic may be anyone of traffic of a user application executed by the UE, and traffic of an external device connected to the UE.

One or more of the following actions may be performed in any suitable order.

Action 9

The PGW-U 120 receives a marking type and a marking value, which originate from a SCS/AS 170 and which are associated with an application identifier for identifying application traffic to be handled according to the marking type and the marking value.

Action 15

The PGW-U 120 receives the application traffic from the UE 110.

Action 16

The PGW-U 120 inspects the application traffic according to the marking type to obtain the marking value.

Action 17

The PGW-U 120 handles the application traffic based on the marking value.

Figure 1:
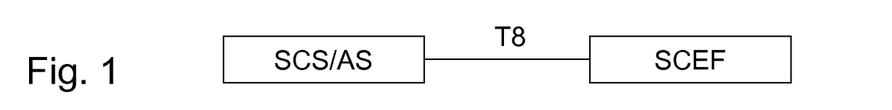
FIG. 1 is a block diagram illustrating an interface between SCS/AS and SCEF.
Figure 2:
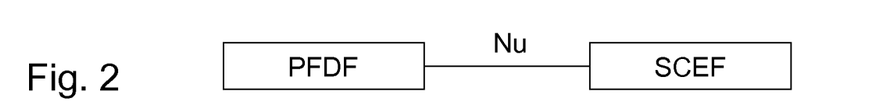
FIG. 2 is another block diagram illustrating another interface between PFDF and SCEF.
Figure 3:
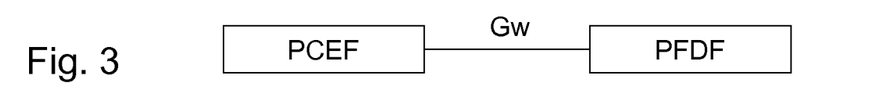
FIG. 3 is a further block diagram illustrating a further interface between PFDF and PCEF.
Figure 4:
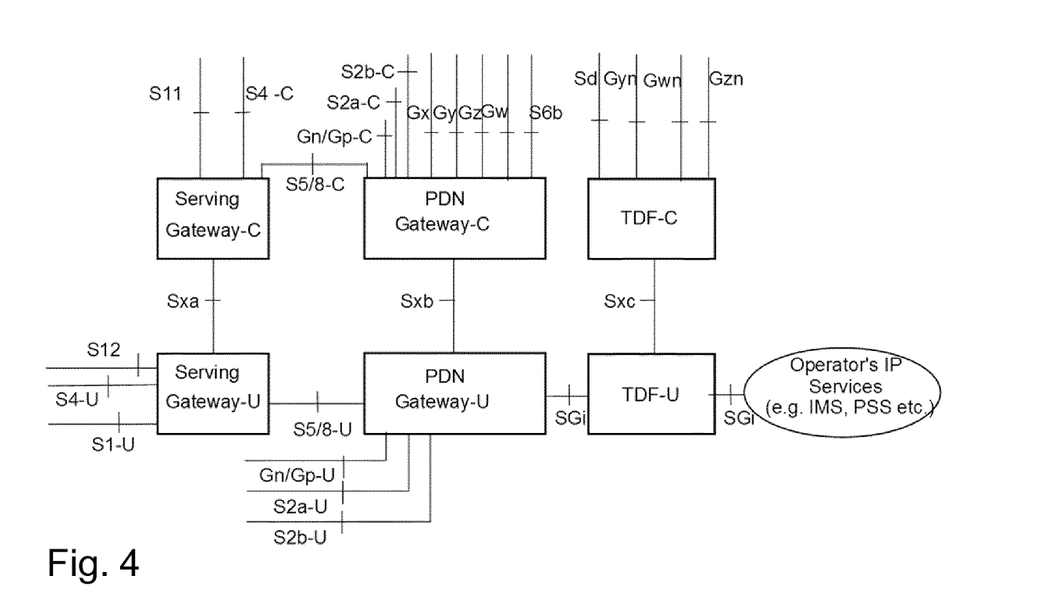
FIG. 4 is a still other block diagram illustrating portions of a known system.
Figure 10:
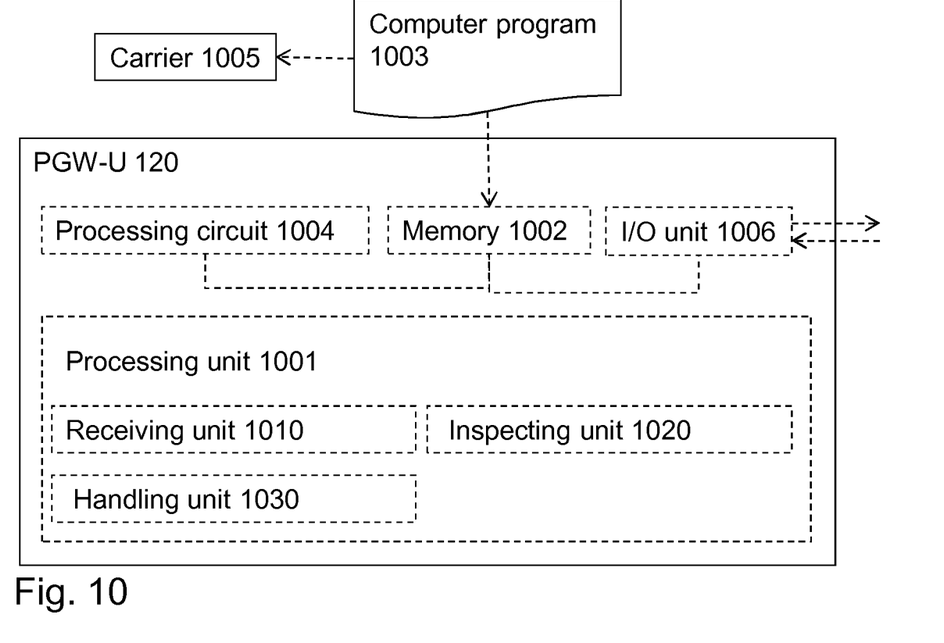
FIG. 10 is a block diagram illustrating embodiments of the PGW-U.

With reference to FIG. 10, a schematic block diagram of embodiments of the PGW-U 120 of FIG. 1 is shown.

The PGW-U 120 may comprise a processing unit 1001, such as a means for performing the methods described herein. The means may be embodied in the form of one or more hardware units and/or one or more software units. The term "unit" may thus refer to a circuit, a software block or the like according to various embodiments as described below.

The PGW-U 120 may further comprise a memory 1002. The memory may comprise, such as contain or store, instructions, e.g. in the form of a computer program 1003, which may comprise computer readable code units.

According to some embodiments herein, the PGW-U 120 and/or the processing unit 1001 comprises a processing circuit 1004 as an exemplifying hardware unit. Accordingly, the processing unit 1001 may be embodied in the form of, or 'realized by', the processing circuit 1004. The instructions may be executable by the processing circuit 1004, whereby the PGW-U 120 is operative to perform the methods of FIG. 6 and/or FIG. 9. As another example, the instructions, when executed by the PGW-U 120 and/or the processing circuit 1004, may cause the PGW-U 120 to perform the method according to FIG. 6 and/or FIG. 9.

In view of the above, in one example, there is provided a PGW-U 120 for managing traffic transmitted by a UE 110, wherein the traffic is associated with a set of PFD related parameters. Again, the memory 1002 contains the instructions executable by said processing circuit 1004 whereby the PGW-U 120 is operative for:

receiving a marking type and a marking value, which originate from a SCS/AS 170 and which are associated with an application identifier for identifying application traffic to be handled according to the marking type and the marking value, receiving the application traffic from the UE 110, inspecting the application traffic according to the marking type to obtain the marking value, and handling the application traffic based on the marking value.

FIG. 10 further illustrates a carrier 1005, or program carrier, which comprises the computer program 1003 as described directly above. The carrier 1005 may be one of an electronic signal, an optical signal, a radio signal and a computer readable medium.

In further embodiments, the PGW-U 120 and/or the processing unit 1001 may comprise one or more of a receiving unit 1010, an inspecting unit 1020, and a handling unit 1030 as exemplifying hardware units. The term "unit" may refer to a circuit when the term "unit" refers to a hardware unit. In other examples, one or more of the aforementioned exemplifying hardware units may be implemented as one or more software units.

Moreover, the PGW-U 120 and/or the processing unit 1001 may comprise an Input/Output unit 1006, which may be exemplified by the receiving unit and/or the sending unit when applicable.

Accordingly, the PGW-U 120 is configured for managing traffic transmitted by a UE 110. The traffic is associated with a set of PFD related parameters.

Therefore, according to the various embodiments described above, the PGW-U 120 and/or the processing unit 1001 and/or the receiving unit 1010 is configured for receiving a marking type and a marking value, which originate from a SCS/AS 170 and which are associated with an application identifier for identifying application traffic to be handled according to the marking type and the marking value.

The PGW-U 120 and/or the processing unit 1001 and/or the receiving unit 1010 is configured for receiving the application traffic from the UE 110.

The PGW-U 120 and/or the processing unit 1001 and/or the inspecting unit 1020 is configured for inspecting the application traffic according to the marking type to obtain the marking value.

The PGW-U 120 and/or the processing unit 1001 and/or the handling unit 10310 is configured for handling the application traffic based on the marking value.

The marking type and a marking value may be receivable from a PGW-C 140.

The marking type may indicate a protocol layer and a field of the protocol layer. The field may carry the marking value.

The PGW-U 120 and/or the processing unit 1001 and/or the receiving unit 1010 may be configured for receiving the marking type and the marking value in a PFD Management Request of an Sx interface.

The marking type and the marking value may be receivable along with PFD-related parameters.

The application traffic may be anyone of:

traffic of a user application executed by the UE, and traffic of an external device connected to the UE.

Figure 11:
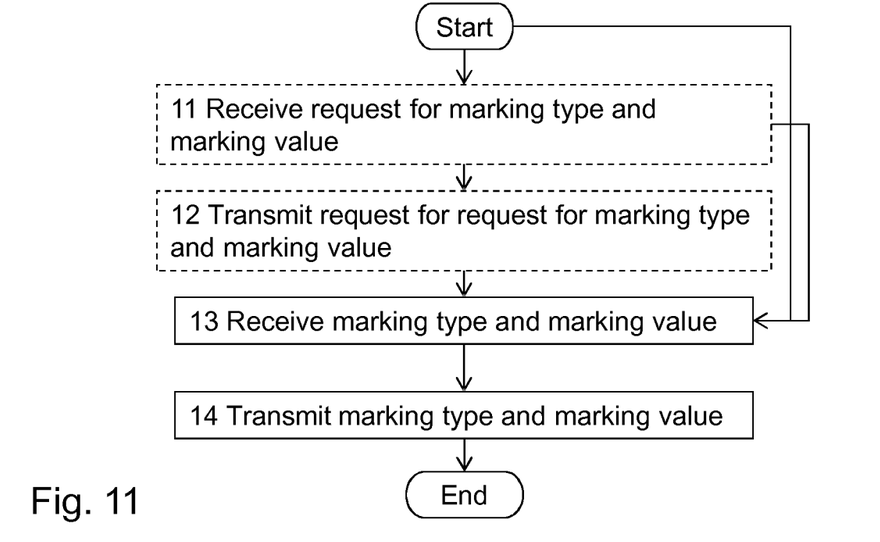
FIG. 11 is a flowchart illustrating embodiments of the method in the MME.

In FIG. 11, a schematic flowchart of exemplifying methods in the MME 130 is shown. Again, the same reference numerals as above have been used to denote the same or similar features, in particular the same reference numerals have been used to denote the same or similar actions. Accordingly, the MME 130 performs a method for enabling differentiation of traffic transmittable by a UE 110.

One or more of the following actions may be performed in any suitable order.

Action 11

The MME 130 may receive, from the UE 110, a request for the marking type and marking value for an application identifier.

Action 12

The MME 130 may transmit, toward one of PGW-C 140 and PFDF 150, a request for the marking type and the marking value for an application identifier.

Action 13

The MME 130 receives, from the one of a PGW-C 140 and a PFDF 150, a marking type and a marking value, which originate from a SCS/AS 170 and which are associated with an application identifier for identifying application traffic to be handled according to the marking type and the marking value.

Action 14

The MME 130 transmits, to the UE 110, the marking type and marking value for the application identifier.

The marking type may indicate a protocol layer and a field of the protocol layer. The field may carry the marking value. The marking type and the marking value may be received along with PFD-related parameters. The application traffic may be anyone of traffic of a user application executed by the UE, and traffic of an external device connected to the UE.

Figure 12:
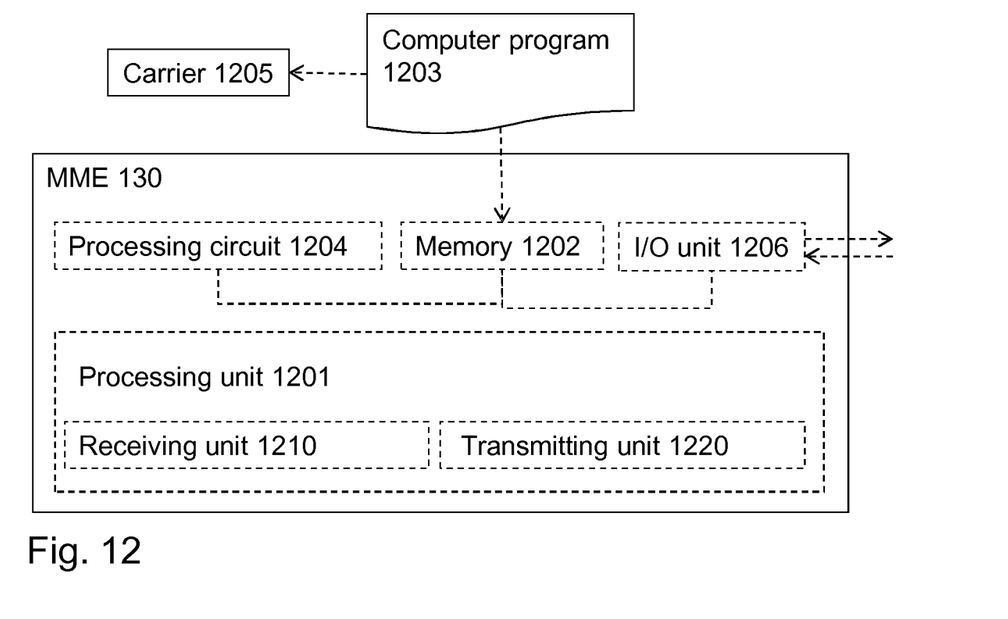
FIG. 12 is a block diagram illustrating embodiments of the MME.

With reference to FIG. 12, a schematic block diagram of embodiments of the MME 130 of FIG. 1 is shown.

The MME 130 may comprise a processing unit 1201, such as a means for performing the methods described herein. The means may be embodied in the form of one or more hardware units and/or one or more software units. The term "unit" may thus refer to a circuit, a software block or the like according to various embodiments as described below.

The MME 130 may further comprise a memory 1202. The memory may comprise, such as contain or store, instructions, e.g. in the form of a computer program 1203, which may comprise computer readable code units.

According to some embodiments herein, the MME 130 and/or the processing unit 1201 comprises a processing circuit 1204 as an exemplifying hardware unit. Accordingly, the processing unit 1201 may be embodied in the form of, or 'realized by', the processing circuit 1204. The instructions may be executable by the processing circuit 1204, whereby the MME 130 is operative to perform the methods of FIG. 6 and/or FIG. 11. As another example, the instructions, when executed by the MME 130 and/or the processing circuit 1204, may cause the MME 130 to perform the method according to FIG. 6 and/or FIG. 11.

In view of the above, in one example, there is provided a MME 130 for enabling differentiation of traffic transmittable by a UE 110. Again, the memory 1202 contains the instructions executable by said processing circuit 1204 whereby the MME 130 is operative for:

receiving, from one of a PGW-C 140 and a PFDF 150, a marking type and a marking value, which originate from a SCS/AS 170 and which are associated with an application identifier for identifying application traffic to be handled according to the marking type and the marking value, and transmitting, to the UE 110, the marking type and marking value for the application identifier.

FIG. 12 further illustrates a carrier 1205, or program carrier, which comprises the computer program 1203 as described directly above. The carrier 1205 may be one of an electronic signal, an optical signal, a radio signal and a computer readable medium.

In further embodiments, the MME 130 and/or the processing unit 1201 may comprise one or more of a receiving unit 1210, and a transmitting unit 1220 as exemplifying hardware units. The term "unit" may refer to a circuit when the term "unit" refers to a hardware unit. In other examples, one or more of the aforementioned exemplifying hardware units may be implemented as one or more software units.

Moreover, the MME 130 and/or the processing unit 1201 may comprise an Input/Output unit 1206, which may be exemplified by the receiving unit and/or the transmitting unit when applicable.

Accordingly, the MME 130 is configured for enabling differentiation of traffic transmittable by a UE 110.

Therefore, according to the various embodiments described above, the MME 130 and/or the processing unit 1201 and/or the MME 130 and/or the processing unit 1201 and/or the receiving unit 1210 is configured for receiving, from one of a PGW-C 140 and a PFDF 150, a marking type and a marking value, which originate from a SCS/AS 170 and which are associated with an application identifier for identifying application traffic to be handled according to the marking type and the marking value.

The MME 130 and/or the processing unit 1201 and/or the transmitting unit 1220 is configured for transmitting, to the UE 110, the marking type and marking value for the application identifier.

The MME 130 and/or the processing unit 1201 and/or the receiving unit 1210 may be configured for receiving, from the UE 110, a request for the marking type and marking value for an application identifier.

The MME 130 and/or the processing unit 1201 and/or the transmitting unit 1220 may be configured for transmitting 13, toward the one of PGW-C 140 and PFDF 150, a request for the marking type and the marking value for an application identifier.

The marking type may indicate a protocol layer and a field of the protocol layer. The field may carry the marking value. The marking type and the marking value may be receivable along with PFD-related parameters. The application traffic may be anyone of traffic of a user application executed by the UE, and traffic of an external device connected to the UE.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on cloud system, which may comprise a set of server machines. In case of a cloud system, the term "node" may refer to a virtual machine, such as a container, virtual runtime environment or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software object, an object according to Component Object Model (COM), a software function, a software engine, an executable binary software file or the like.

The terms "processing unit" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a system comprising a User Equipment (UE), a Packet GateWay User plane function (PGW-U), a Mobility Management Entity (MME), and a Service Capability Server/Application Server (SCS/AS), for managing traffic transmitted by the UE, wherein the traffic is associated with a set of Packet Flow Description (PFD) related parameters, wherein the method comprises:
   transmitting, by the UE toward the MME, a request for a marking type and a marking value, which originate from the SCS/AS and which are associated with a software application identifier for identifying software application traffic to be handled according to the marking type and the marking value,
   transmitting, by the MME, the request,
   receiving, by the MME, the marking type and the marking value for the software application identifier,
   transmitting, by the MME toward the UE, the marking type and the marking value,
   receiving by the PGW-U, the marking type and the marking value,
   receiving, by the UE from the MME, the marking type and the marking value, which originate from the SCS/AS and which are associated with the software application identifier,
   transmitting, by the UE towards the PGW-U, the software application traffic marked according to the marking type and the marking value,
   inspecting, by the PGW-U, the software application traffic according to the marking type to obtain the marking value, and
   handling, by the PGW-U, the software application traffic based on the marking value.

2. A method, performed by a User Equipment (UE), for enabling differentiation of traffic transmittable by the UE, wherein the method comprises:
   transmitting, by the UE toward a Mobility Management Entity (MME), a request for a marking type and a marking value, which originate from a Service Capability Server/Application Server (SCS/AS) and which are associated with a software application identifier for identifying software application traffic to be handled according to the marking type and the marking value, such that:
     the request is transmitted by the MME,
     the marking type and the marking value for the software application identifier are received by the MME,
     the marking type and the marking value are transmitted by the MME toward the UE,
   receiving, from the MME, the marking type and the marking value, and transmitting, towards a Packet GateWay User plane function (PGW-U), the software application traffic marked according to the marking type and the marking value.

3. A system, comprising a User Equipment (UE), a Packet GateWay User plane function (PGW-U), a Mobility Management Entity (MME), and a Service Capability Server/Application Server (SCS/AS), configured for managing traffic transmitted by the UE, wherein the traffic is associated with a set of Packet Flow Description (PFD) related parameters, wherein
the UE comprising one or more processors configured for transmitting, toward the MME, a request for a marking type and a marking value, which are associated with a software application identifier for identifying software application traffic to be handled according to the marking type and the marking value,
the MME comprising one or more processors configured for:
transmitting the request,
receiving the marking type and the marking value for the software identifier;
the SCS/AS comprising one or more processors configured for transmitting the marking type and the marking value,
the PGW-U comprising one or more processors configured for receiving the marking type and the marking value, which originate from the SCS/AS,
the MME comprising one or more processors configured for transmitting, towards the UE, the marking type and the marking value, which originate from the SCS/AS and which are associated with the software application identifier,
the UE comprising one or more processors configured for receiving, from the MME, the marking type and the marking value, which originate from the SCS/AS and which are associated with the software application identifier,
the UE comprising one or more processors configured for transmitting towards the PGW-U, the software application traffic marked according to the marking type and the marking value,
the PGW-U comprising one or more processors configured for receiving the software application traffic from the UE,
the PGW-U comprising one or more processors configured for inspecting the software application traffic according to the marking type to obtain the marking value, and
the PGW-U comprising one or more processors configured for handling the software application traffic based on the marking value.

4. The system according to claim 3, wherein the marking type indicates a protocol layer and a field of the protocol layer, wherein the field carries the marking value.

5. The system according to claim 3, wherein the UE comprises one or more processors configured for receiving the marking type and the marking value in a marking configuration message of an S1-MME interface.

6. The system according to claim 3, wherein the PGW-U comprises one or more processors configured for receiving the marking type and the marking value in a PFD Management Request of an Sx interface.

7. The system according to claim 3, wherein the marking type and the marking value are receivable along with PFD-related parameters.

8. The system according to claim 3, wherein the software application traffic is anyone of:
traffic of a user application executed by the UE, and
traffic of an external device connected to the UE.

9. A User Equipment (UE) comprising a processing circuit configured for enabling differentiation of traffic transmittable by the UE, wherein the UE comprises one or more processors configured for:
transmitting, by the UE toward a Mobility Management Entity (MME), a request for a marking type and a marking value, which originate from a Service Capability Server/Application Server (SCS/AS) and which are associated with a software application identifier for identifying software application traffic to be handled according to the marking type and the marking value, such that:
the request is transmitted by the MME,
the marking type and the marking value for the software application identifier are by the MME,
the marking type and the marking value are transmitted by the MME toward the UE,
receiving, from the MME, the marking type and the marking value, and
transmitting, toward a Packet GateWay User plane function (PGW-U), the software application traffic marked according to the marking type and the marking value.

10. The UE according to claim 9, wherein the marking type indicates a protocol layer and a field of the protocol layer, wherein the field carries the marking value.

11. The UE according to claim 9, wherein the UE comprises one or more processors configured for receiving the marking type and the marking value in a marking configuration message of an S1-MME interface.

12. The UE according to claim 9, wherein the marking type and the marking value are receivable along with PFD-related parameters.

13. The UE according to claim 9, wherein the software application traffic is anyone of:
traffic of a user application executed by the UE, and
traffic of an external device connected to the UE.

14. A Packet GateWay User plane function (PGW-U) comprising a processing circuit configured for managing traffic transmitted by a User Equipment (UE), wherein the traffic is associated with a set of Packet Flow Description (PFD) related parameters, wherein the PGW-U comprises one or more processors configured for:
receiving a marking type and a marking value, which originate from a Service Capability Server/Application Server (SCS/AS) and which are associated with a software application identifier for identifying software application traffic to be handled according to the marking type and the marking value, such that:
a request for the marking type and the marking value is transmitted by a Mobility Management Entity (MME),
the marking type and the marking value for the software application identifier are received by the MME,
the marking type and the marking value are transmitted by the MME toward the UE,
receiving the software application traffic from the UE,
inspecting the software application traffic according to the marking type to obtain the marking value, and
handling the software application traffic based on the marking value.

15. The PGW-U according to claim 14, wherein the marking type and the marking value are receivable from a Packet Data Network (PDN) Gateway Control plane function (PGW-C).

16. The PGW-U according to claim 14, wherein the marking type indicates a protocol layer and a field of the protocol layer, wherein the field carries the marking value.

17. The PGW-U according to claim 14, wherein the PGW-U comprises one or more processors configured for receiving the marking type and the marking value in a PFD Management Request of an Sx interface.

18. The PGW-U according to claim 14, wherein the marking type and the marking value are receivable along with PFD-related parameters.

19. The PGW-U according to claim 14, wherein the software application traffic is anyone of:
   traffic of a user application executed by the UE, and
   traffic of an external device connected to the UE.

20. A Mobility Management Entity (MME) comprising a processing circuit configured for enabling differentiation of traffic transmittable by a User Equipment (UE), wherein the MME comprises one or more processors configured for:
   receiving, from the UE, a request for a marking type and a marking value, which originate from a Service Capability Server/Application Server (SCS/AS) and which are associated with a software application identifier for identifying software application traffic to be handled according to the marking type and the marking value, such that:
      the marking type and the marking value for the software application identifier are transmitted by a Packet GateWay Control plane function (PGW-C), toward the MME,
      the marking type and the marking value are transmitted by the MME toward the UE,
   transmitting, toward the PGW-C, the request:
   receiving, by the MME, the marking type and the marking value, and
   transmitting, to the UE, the marking type and marking value for the software application identifier.

21. The MME according to claim 20, wherein the marking type indicates a protocol layer and a field of the protocol layer, wherein the field carries the marking value.

22. The MME according to claim 20, wherein the marking type and the marking value are receivable along with PFD-related parameters.

23. The MME according to claim 20, wherein the software application traffic is anyone of:
   traffic of a user application executed by the UE, and
   traffic of an external device connected to the UE.

* * * * *